May 1, 1928.
S. C. AWBREY
FLOOR JOINER
Filed Nov. 21, 1927
1,667,712
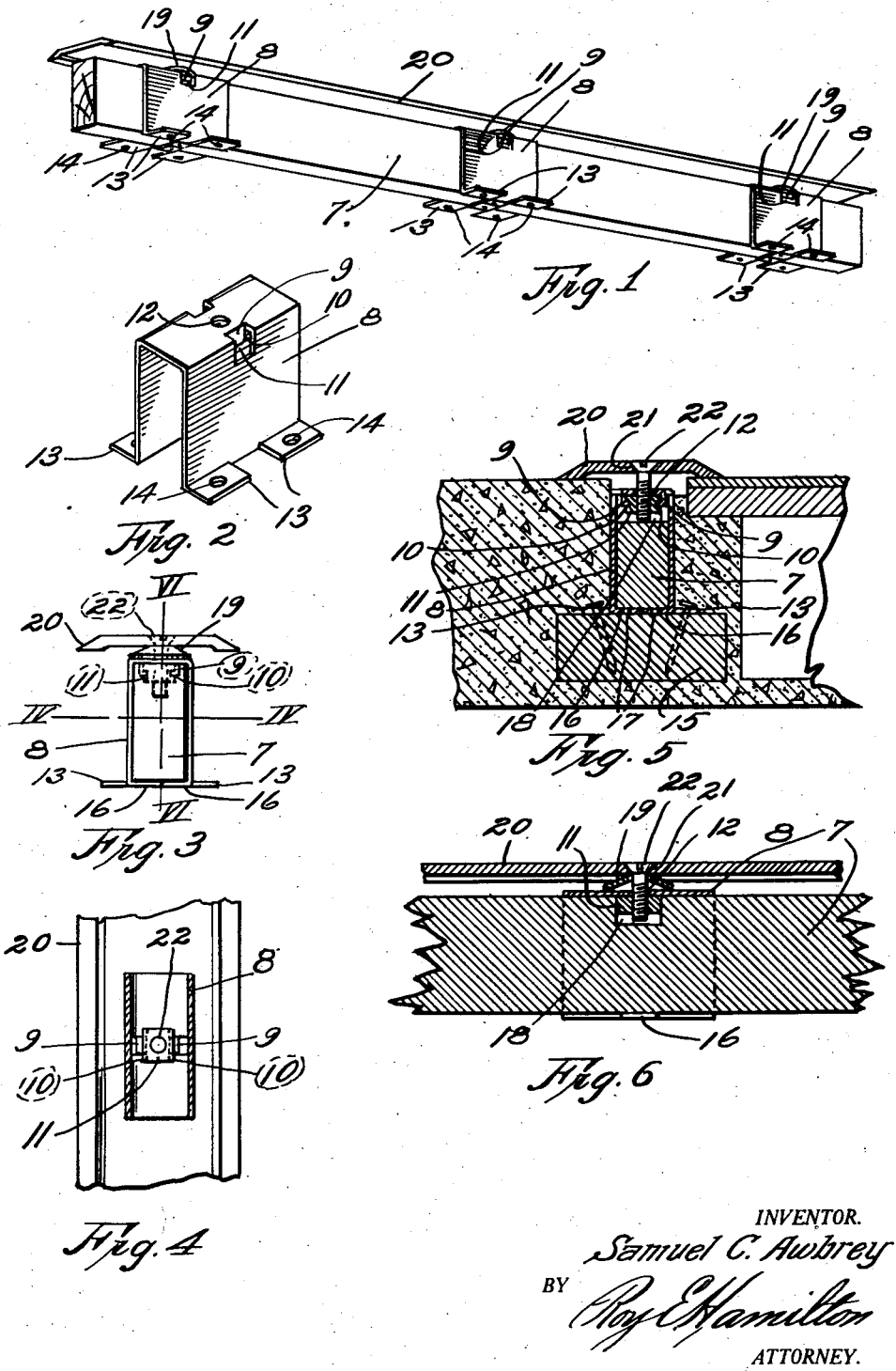
INVENTOR.
Samuel C. Awbrey
BY
Roy E. Hamilton
ATTORNEY.

Patented May 1, 1928.

1,667,712

UNITED STATES PATENT OFFICE.

SAMUEL C. AWBREY, OF KANSAS CITY, MISSOURI, ASSIGNOR TO ETHEL AWBREY, OF KANSAS CITY, MISSOURI.

FLOOR JOINER.

Application filed November 21, 1927. Serial No. 234,849.

This invention relates to floor joiners which are assembled and adapted to be shipped to the job ready to be installed in the building, to cover the joints of abutting floors without the usual tasks of measuring and fitting to make the parts properly cooperate.

One object of this invention is to provide a floor joiner having a bar to which is securely attached clamps having flanges for securing the same in position, and a binding plate adjustably carried by said bar.

Another object is the provision of a floor joiner having an anchoring member by means of which the plate may be adjusted to properly fit the floor as it shrinks or wears, thus providing a permanently tight and attractive joiner for new or old floors made of any kind of material.

A further object of this invention is the contemplation of a floor joiner having a temporary spacing washer between the plate and the bar to insure a tightening space when the joiner is installed, and the washer removed.

Still further objects of this invention are ease of installation, ease of adjustment, adaptability to varying conditions, and durability of construction.

With these general objects in view, as well as minor objects which will appear in the course of the detailed specification, the invention will now be described with reference to the accompanying drawing, illustrating a construction embodying the improvements of this invention.

In the drawing—

Figure 1, is a perspective view of a floor joiner embodying this invention.

Fig. 2, is a perspective view of one of the clamps detached.

Fig. 3, is an end elevation of the floor joiner showing the temporary spacing washer in assembled position, and with the bar omitted.

Fig. 4, is an inverted horizontal section taken on line IV—IV of Fig. 3.

Fig. 5, is a cross-section of the floor joiner shown in operative position in a floor construction, and Fig. 6, is a fragmentary longitudinal section taken on line VI—VI of Fig. 3.

Similar reference characters designate like parts throughout the several views, and the numeral 7 designates a bar made of wood or any suitable material, which is preferably rectangular in cross-section, and is provided with a series of spaced apart clamps 8, which are securely held in position as hereinafter clearly set forth. The bar 7 may be made up in long sections with the clamps equally spaced thereon, and then sawed to the proper length to be used in any desired place. As is clearly shown in Fig. 5, the clamp 8 is provided with a pair of inturned flanges 9 preferably punched from, and integral with said clamp. These flanges are adapted to engage slots 10 which are formed in the nuts 11. When the clamp 8 has been properly formed, and the nut pressed into position, as shown in Figs. 5 and 6, a hole 12 in the upper surface of the clamp 8 will register with the threaded opening in the nut. The lower portion of clamp 8 is provided with oppositely disposed flanges 13, having perforations 14, for the reception of nails by means of which the clamp may be securely attached to the nailing block 15, as shown in Fig. 5. Positioned between flanges 13 and integral with clamp 8, are inwardly turned flanges 16 which serve to encase the bar 7, and have nail holes 17 which may be used for the reception of nails to secure the lower portion of clamp 8 to bar 7 to prevent spreading. The flanges 16 are of such length that should the clamps 8 be used without the bar 7 or should the wood bar decay so that they no longer serve as a filler for the clamp, then the abutting adjacent ends of the flanges will serve to prevent the crushing in of the clamp. As clearly shown in Figs. 5 and 6, it will be noted that the bar 7 is provided with grooves 18, of sufficient dimension to receive nuts 11, thus making it possible to properly space and securely hold the clamps in predetermined relative positions on the bar.

Positioned above bar 6, and spaced apart therefrom by means of temporary spacing washers 19, is the joiner plate 20, having a series of countersunk holes 21 for the reception of flat headed screws 22. This joining plate 20 may be of any standard threshold plate shape, or when it is desired to maintain a smooth level surface where the floors are joined, a flat plate may be used.

When it is desired to install a floor joiner of this type, a trough is formed in the floor construction between the adjacent edges of the two floors and nailing blocks are inserted therein, so that when the assembled floor binder with the temporary spacing washers in position is mounted thereon, the under surface of the binding plate will be approximately at the level of the floor surfaces. The clamp members are then nailed to the nailing block. The binding plate is removed, and concrete is then poured around the nailing block and bar to a depth sufficient to securely anchor the binding bar and clamp securely in a fixed position. The temporary spacing washers 19 are removed, and the binding plate 20 is securely attached to the anchored clamp by means of screws 22.

Should the floor shrink or wear and the binder plate become loose, the screws may be turned to again draw it to a snug fit and due to the fact that the clamp, binder plate, bolt and nut are preferably made of rust proof material, the joiner will always be in condition to be adjusted, and will last much longer than the ordinary type.

I do not limit this invention to the structure shown and described, as many modifications may be made within the scope of the appended claims without departing from the spirit thereof.

What is claimed as new and desired to be secured by Letters Patent is:

1. As a new article of manufacture, a floor joiner comprising a bar, a plurality of spaced apart clamps securely carried by said bar, oppositely disposed flanges extending outwardly from said clamps, a binding plate carried by said bar and means for adjustably connecting said bar and binding plate.

2. As a new article of manufacture, a floor joiner comprising a rectangular bar, a plurality of equally spaced apart clamps securely carried by said bar, oppositely disposed flanges extending outwardly from each of said clamps, a binding plate carried by said bar, and means for adjustably connecting said bar and binding plate.

3. As a new article of manufacture, a floor joiner comprising a bar, a plurality of spaced apart clamps encompassing said bar, means for securing said clamps against longitudinal movement on said bar, oppositely disposed flanges extending outwardly from the lower portion of each of said clamps, a binding plate carried by said clamps and means for adjustably connecting said clamps and binding plate.

4. As a new article of manufacture, a floor joiner comprising a bar having a plurality of notches in one edge thereof, a plurality of spaced apart clamps securely attached to said bar, oppositely disposed flanges extending outwardly from the lower edge of each of said clamps, a nut carried by each of said clamps and positioned in a notch in said bar, a binding plate carried by said bar and a bolt for adjustably connecting said bar and binding plate.

5. As a new article of manufacture, a floor joiner comprising a rectangular bar having a plurality of notches in one edge thereof, a plurality of equally spaced apart clamps encompassing said bar, oppositely disposed flanges extending outwardly from the lower edge of each of said clamps, a nut carried by each of said clamps and positioned in one of the notches in said bar, a binding plate carried by said bar and separated therefrom by means of washers.

6. As a new article of manufacture, a floor joiner comprising a bar having a plurality of spaced apart notches in one edge thereof, spaced apart clamps encompassing said bar and positioned over said notches, oppositely disposed flanges extending outwardly from each of said clamps, a nut carried within each of said clamps, a binding plate positioned above said bar, and bolts to engage said plate and nuts to adjustably secure said plate to said clamps.

7. As a new article of manufacture, a floor joiner comprising a rectangular bar having a series of equally spaced apart notches in one edge thereof, a clamp encompassing said bar at each of said notches, and means for securing said bar and clamps against relative longitudinal movement, oppositely disposed flanges integral with and extending outwardly from each of said clamps, a binding plate positioned adjacent the notched edge of said bar and means for securing said bar and binding plate in a fixed spaced apart relation.

In testimony whereof, I hereunto affix my signature.

SAMUEL C. AWBREY.